Nov. 15, 1938.  C. A. CAMPBELL  2,136,581
AIR BRAKE
Filed Sept. 9, 1935  2 Sheets-Sheet 1

Inventor
Charles A. Campbell
By
Dodge and Sons
Attorneys

Nov. 15, 1938.  C. A. CAMPBELL  2,136,581
AIR BRAKE
Filed Sept. 9, 1935   2 Sheets-Sheet 2

Inventor
Charles A. Campbell
By
Attorneys

Patented Nov. 15, 1938

2,136,581

UNITED STATES PATENT OFFICE 2,136,581

AIR BRAKE

Charles A. Campbell, Watertown, N. Y., assignor to The New York Air Brake Company, a corporation of New Jersey Application September 9, 1935, Serial No. 39,871

16 Claims. (Cl. 303—26)

This invention relates to air brakes, and particularly to combined application and vent valves used in systems having a normally charged brake pipe, whose venting serves to produce an emergency application. Such systems include the well known automatic system and also various two pipe straight air systems such as those now coming into extensive use on high speed trains.

The function of the vent valve is to augment an emergency reduction, however initiated. If the emergency reduction be initiated by means other than the engineer's brake valve, for example by a conductor's valve, or a deadman valve, there is a possibility that the engineer's brake valve or its equivalent will be in release position and thus feed air to the brake pipe. Since the vent valve automatically closes after a period it is essential that the operation of the vent valve shall serve to shut off the supply of main reservoir air to the engineer's brake valve. Otherwise an undesired release of the brakes might occur.

One purpose of the present invention is to terminate the supply of air to the engineer's brake valve as an incident to the operation of the vent valve.

Another purpose is to secure rapid and certain operation.

Other features of the invention will become clear upon consideration of the following description of a preferred embodiment.

In the accompanying drawings:—

Figures 1, 2:
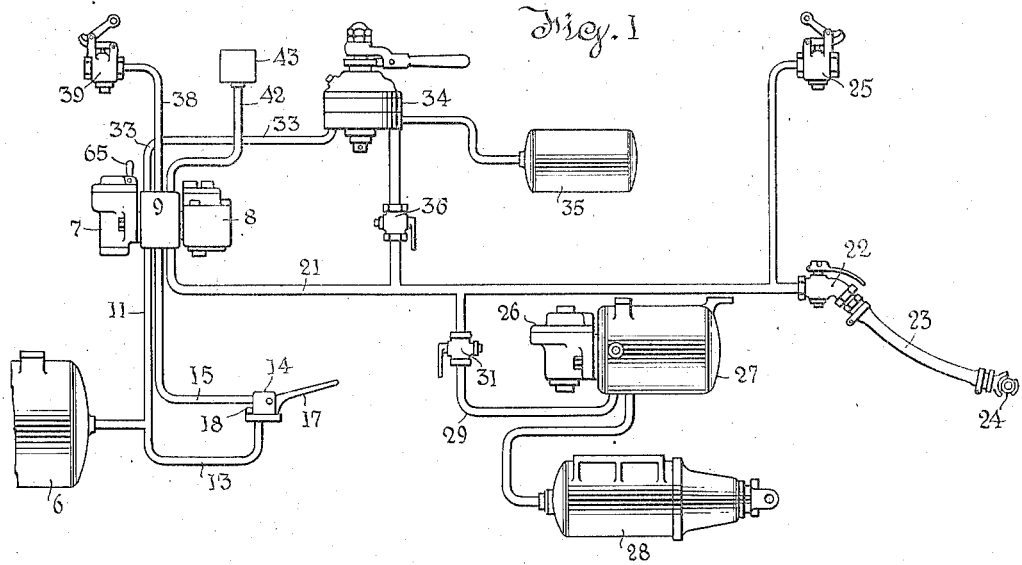
Fig. 1 is a diagrammatic elevation showing the improved application and vent valve incorporated in a simple automatic brake system.
Fig. 2 is a section through the application and vent valve in charging and release position.
Figure 3:
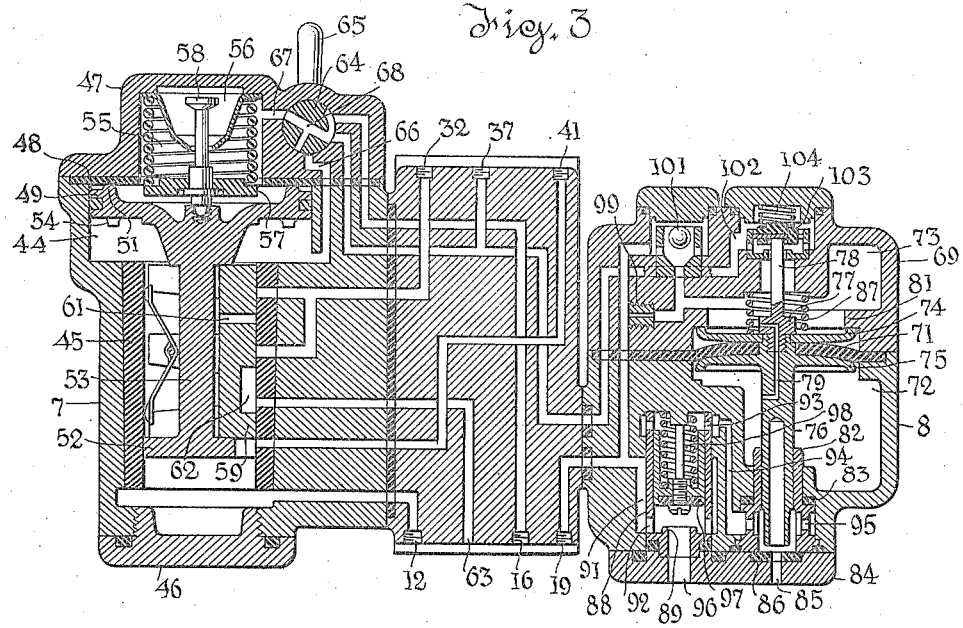
Fig. 3 is a similar view showing emergency position.
Figure 4:
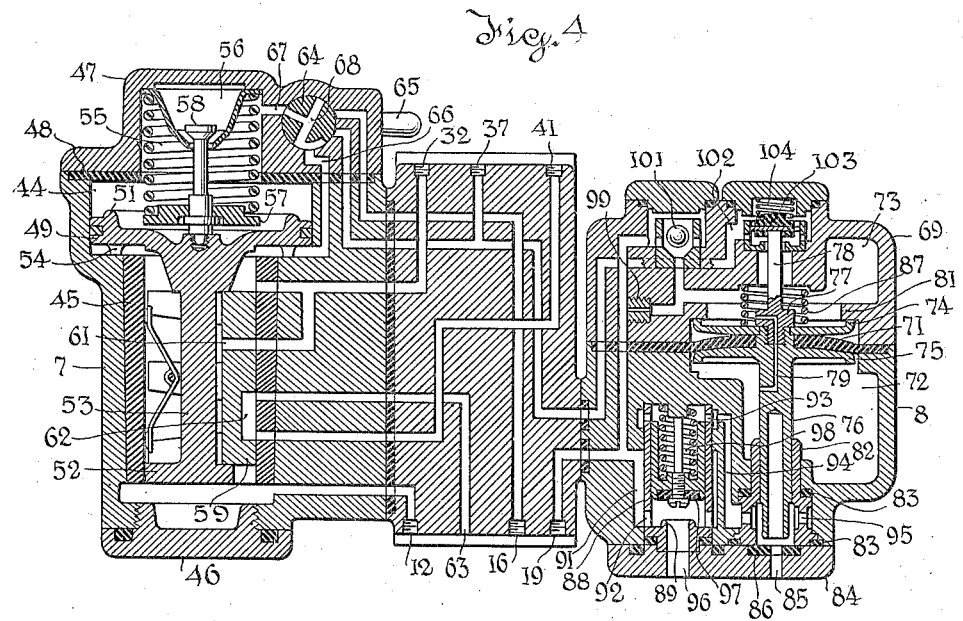
Fig. 4 is a similar view showing the application valve cut out, and the vent valve in emergency position.

In Figs. 2 to 4 inclusive, the ports are drawn as if they lay all in a single plane, this being a familiar convention to permit all flows to be readily traced.

Referring first principally to Fig. 1 the main reservoir or other source of compressed air is indicated at 6, and the mounting bracket for the application valve 7 and vent valve 8 is indicated at 9. The numerals 7 and 8 are applied to the bodies of the two valves in Fig. 1.

Bracket 9 is provided with six distinct ports each of which has an extension in the body of valve 7 or body of valve 8 or both. The bracket 9 affords means for connecting pipes with these ports.

From main reservoir 6 there is a main air supply pipe 11 connected to port 12 in bracket 9. A branch pipe 13 leads through the deadman foot valve 14 and pipe 15 to port 16 in bracket 9. The foot valve has a pedal 17 urged upward by a spring (not shown), and an atmospheric vent 18. When held depressed it connects pipes 13 and 15 and closes vent 18. When released it closes off pipe 13 and connects pipe 15 with vent 18. Foot valves of this description are well known.

From a connection with port 19 in bracket 9 there leads the brake pipe 21 which extends throughout the train and is connected from car to car by angle cocks 22, flexible hose 23 and couplings 24, as usual. A normally closed conductor's valve 25 is provided on each car and may be operated to vent the brake pipe. On each vehicle is a braking unit comprising a triple valve 26, auxiliary reservoir 27 and brake cylinder 28 whose construction and operation are too familiar to require description.

The brake pipe 21 is connected with each braking_unit by a branch pipe 29 through cut-out cock 31.

From port 32 in bracket 9 the supply pipe 33 leads to the engineer's brake valve 34. This engineer's brake valve is of the equalizing discharge type and has the usual equalizing reservoir 35. Brake valve 34 is connected with brake pipe 21 through the usual double-heading cock 36.

The system so far described is a typical and very simple automatic brake system and is intended to indicate one way in which the application and vent valve may be installed and used.

Leading from port 37 in bracket 9 is a pipe 38 on which is mounted a normally closed conductor's valve 39. Leading from port 41 in the bracket 9 is a pipe 42 which in emergency supplies air to device 43 which may be any pressure operated device to which air should be supplied in emergency. Such mechanisms include throttle controls for the propelling motors, supplemental brakes, deceleration control loaders, sanders, etc., etc., all of which have been used in the art and one or more of which may be connected to be actuated. The particular mechanism so operated is not a feature of the invention, but the incorporation of means for supplying air to any such device or devices in emergency is a valuable feature of the valve mechanism here disclosed.

Referring now to Figs. 2 to 4 inclusive, the body 7 of the application valve encloses a cylinder 44 and a communicating slide valve chamber, provided with the usual bushing 45. The lower end of the slide valve chamber is closed by a screw plug 46, and the upper end of cylinder 44 is closed by a cap 47. A gasket 48 seals the joint and offers a seat for the piston 49 which has a bead 51 to ensure a seal. The piston has the usual packing ring and is guided by a spider 52 on the end of stem 53. Stand-off lugs 54 limit downward motion of the piston and ensure that the entire area of the piston is always subject to the pressure in the slide valve chamber.

The piston is urged downward by a coil compression spring 55. This is confined between seats 56 and 57 limited as to their separation by headed pin 58 so that the extension of the spring is limited and it can therefore readily be mounted under stress between piston 49 and cap 47. A boss on the end of pin 58 enters the threaded puller hole in the piston and thus centers the spring assembly.

Port 12 supplies main reservoir air to the slide valve chamber at all times. A slide valve 59 closely confined in a notch in stem 53, has a through port 61 and a cavity 62. When valve 59 is in its lower position (Fig. 2), port 61 and the upper end of the valve expose two branches of port 32, so that main reservoir air is supplied to the engineer's brake valve. When valve 59 is in its upper position (Fig. 3), both branches of port 32 are blanked by the slide valve and no air is supplied to the engineer's brake valve. The purpose of using two branches of port 32 to the slide valve seat is to secure large port capacity with short valve travel.

In the lower position of valve 59 cavity 62 connects port 41 with an atmospheric exhaust port 63. In the upper position this connection is interrupted and port 41 is exposed by valve 59 so that main reservoir air is supplied through port 41 to the device or devices 43 above described.

Mounted in cap 47 is a cock plug 64 which may be turned 90° between two functionally significant positions by means of handle 65.

To the seat of plug 64 lead four ports, namely, foot valve port 16, a branch of conductor's valve port 37, a port 66 which leads from the slide valve chamber or space below piston 49, and a port 67 which leads from the space above piston 49. With the cock in normal position (Figs. 2 and 3) ports 16 and 37 are both connected with port 67 and hence with each other, the ports together serving as a controlling connection. Port 66 is blanked. With the cock in the other position (Fig. 4) ports 16 and the branch of port 37 are each blanked and hence disconnected from one another, and ports 66 and 67 are connected with each other. At such time port 37 alone is the controlling connection. The porting of the cock plug 64 to effect the described control is clearly indicated at 68 on the drawings.

Connection of ports 66 and 67 equalizes pressures on the two faces of piston 49, so that spring 55 will hold the piston and valve 59 continuously in their lower position (see Fig. 4) in which air is supplied to the engineer's brake valve, and the accessory device 43 is inactive. The blanking of foot valve port 16 and the branch of conductor's valve port 37 renders the foot valve ineffective as to both the application valve (above described) and the vent valve (to be described) but leaves the conductor's valve port 37 operatively connected with the vent valve.

The housing of the vent valve comprises a body 8 and a cap 69 between which a combined flexible diaphragm and gasket 71 is clamped, the diaphragm separating a small reservoir chamber 72 in body 8 from a small brake pipe chamber 73 in cap 69. Clamped through the center of the diaphragm are two thrust discs 74 and 75, the lower disc 75 being formed integrally with a tubular valve stem 76 and the upper disc 74 being attached thereto by a flanged hub 77 which passes through the center of the disc 74 and is threaded into the hub of disc 75. Hub 77 carries a slender pin 78. A restricted port 79 extends through hub 77 and stem 76 to permit charging of reservoir 72 from brake pipe chamber 73, and back flow at a service rate from reservoir 72 to brake pipe chamber 73, so that diaphragm 71 will not develop any substantial upward tendency during service reductions of brake pipe pressure but will rise sharply in response to emergency reductions. The thrust discs not only control the flexure of the diaphragm but upper disc 74 engages a flange 81 in cap 69 to limit upward displacement.

Stem 76 is guided in a bushing 82 clamped in a recess formed in body 8 and sealed thereto by two ring gaskets 83. The bushing 82 is held in place by a cap 84 which has an atmospheric port 85 surrounded by a rubber or like seat 86 against which the end of stem 76 seats. A coil compression spring 87 reacts between disc 74 and a portion of cap 69 and holds the end of stem 76 in sealing engagement with seat 86. The end of the stem is counterbored to secure a tight seal.

Mounted in a cavity in body 8 adjacent bushing 82 is a second bushing 88 which has an annular, inwardly facing valve seat 89. The bushing 88 is surrounded at its lower end by a chamber 91 with which the brake pipe port 19 communicates, and from chamber 91 ports 92 lead through the bushing to the space outside the seat 89. Bushing 88 is surrounded at its upper end by a channel with which through ports 93 communicate, and this channel is connected by passage 94 with ports 95 leading to the interior of bushing 82 around the lower end of valve stem 76.

When valve stem 76 lifts it vents the space within the upper end of bushing 88 to atmosphere.

An atmospheric port 96 leads through seat 89, and a combined valve and piston 97, cup-shaped in form, fits loosely in bushing 88 and coacts with seat 89. It carries a rubber seating face on its lower end to ensure a tight seal on seat 89 and is urged downward toward the seat by a coil compression spring 98. It will be observed that an annular area on the end of piston 97 outside seat 89 is subject to brake pipe pressure acting in opposition to spring 98, and that the space within bushing 88 above piston 97 may be charged by flow from brake pipe port 19 between the bushing and the loosely fitted piston.

A branch of brake pipe port 19 communicates with chamber 73 through a choke 99, while free back flow from chamber 73 to port 19 is permitted by the ball check valve 101.

A branch of conductor's valve port 37 leads to chamber 102 above the rubber poppet type valve 103. A light spring 104 urges the valve toward its seat, the valve being so arranged that it will open to permit back flow and will be forced open by stem 78 when diaphragm 71 rises in response to an emergency reduction of brake pipe pressure.

OPERATION

Automatic systems are quite well known. The brake pipe is normally charged, at which time the triple valve moves to release position and controls charging of the auxiliary reservoir. A slow reduction of brake pipe pressure produced by manipulation of the engineer's brake valve causes the triple valve to move to service position and feed auxiliary air to the brake cylinder. The braking pressure developed depends on the degree of reduction of brake pipe pressure. Emergency applications are produced by rapid venting of the brake pipe to which the triple valve responds to feed brake pipe air to the brake cylinder and then to permit equalization between the auxiliary reservoir and the brake cylinder. Release is produced by reestablishing brake pipe pressure. This being the general character of the system illustrated, the operation of the application and vent valves can now be discussed.

*Charging.*—(Fig. 2) Air flows from main reservoir 6 via pipe 11, port 12, port 32 and pipe 33 to engineer's brake valve 34. With the latter in release position the system is charged as usual. This presupposes that pedal 17 is held depressed (or that cock 64 is in the position of Fig. 4) as otherwise piston 49 would be forced up cutting off the supply to the engineer's brake valve. Depression of the pedal admits main reservoir air via port 16 and cock port 68 to the space above piston 49 (so that spring 55 holds the piston down) and to port 37, and through a branch of port 37 to chamber 102 above valve 103. At such time valve 97 is held closed by spring 98. Brake pipe air flows from port 19 through ports 92, and between valve 97 and bushing 88 to the space above valve 97 to assist in holding this closed.

Rising brake pipe pressure causes flow via port 19 and choke 99 to chamber 73, and thence through port 79 to chamber 72, charging the latter to brake pipe pressure. Thus valve 76 is closed against seat 86 under the urge of spring 87 and valve 103 is allowed to close under the urge of its light spring.

*Service.*—On a service reduction of brake pipe pressure air flows from chamber 73 past check valve 101, and back flow through port 79 from chamber 72 reduces chamber pressure to keep pace. Nothing occurs except that the vent valve remains conditioned to respond to an emergency reduction of brake pipe pressure.

*Emergency.*—(Fig. 3) If brake pipe pressure be reduced at an emergency rate, for example by opening conductor's valve 25, diaphragm 71 will rise unseating valve stem 76 and opening valve 103. Venting of passage 94 through ports 95, 85, causes vent valve 97 to open since it is subject at its lower margin to brake pipe pressure. This vents the brake pipe and since valve 103 is unseated also vents port 37 and chamber 44 by way of the brake pipe. Consequently piston 49 and valve 59 rise, cutting off the supply of main reservoir air to the engineer's brake valve, and admitting main reservoir air to port 41 and thence through pipe 42 to the accessory device 43.

Upon the initiation of such an application the engineer should remove his foot from pedal 17 cutting off the supply of air to port 16. To release such an application (assuming the brake pipe is no longer vented and the engineer's brake valve has remained in release position) he depresses pedal 17.

If an emergency application is initiated by release of pedal 17 or by operation of valve 39 the venting of port 37 causes back flow from chamber 73 through valve 103. This causes diaphragm 71 to rise, opening the vent from the space above valve 97, by way of ports 93, passage 94, ports 95 and vent 85. Opening of valve 97 vents the brake pipe.

*Effect of cut-out cock 68.*—If cock 68 be set in the position of Fig. 4, the application piston 49 and valve 59 remain in their lower position. Hence feed to the engineer's brake valve is not cut off during emergency applications, the accessory device 43 is not operated and the deadman valve 14 is cut out. Valve 39 is supplied primarily for the purpose of causing applications under this condition, as it remains connected. The vent valve functions as already described. When automatic emergency applications are initiated the engineer should move his brake valve 34 to lap position.

While a particular embodiment of the invention has been described in detail it is intended to be illustrative and not limiting. Modifications are possible within the scope of the invention.

What is claimed is:

1. In an air brake system, the combination of a normally charged brake pipe; a normally charged controlling connection normally isolated from the brake pipe; pressure controlled means for interrupting the supply of air to the system in response to venting of said connection; and a brake pipe vent valve mechanism adapted to respond to sudden reduction of brake pipe pressure and to respond to sudden reduction of control connection pressure to vent both said connection and said pipe.

2. In an air brake system, the combination of a normally charged brake pipe; a normally charged controlling connection normally isolated from the brake pipe; pressure controlled means subject directly to pressure in said control connection for interrupting the supply of air to the system in response to venting of said connection; and a brake pipe vent valve mechanism adapted to respond to sudden reduction of brake pipe pressure and to respond to sudden reduction of control connection pressure to connect the controlling connection with the brake pipe and vent the brake pipe.

3. In an air brake system, the combination of a normally charged brake pipe; a normally charged controlling connection normally isolated from the brake pipe; pressure controlled means for interrupting the supply of air to the system in response to venting of said connection; a brake pipe vent valve mechanism adapted to respond to sudden reduction of brake pipe pressure and to respond to sudden reduction of control connection pressure to vent both said connection and said pipe; and independent means for venting the brake pipe and for venting the controlling connection.

4. In an air brake system, the combination of a normally charged brake pipe; a normally charged controlling connection normally isolated from the brake pipe; pressure controlled means subject directly to pressure in said connection for interrupting the supply of air to the system in response to venting of said connection; a brake pipe vent valve mechanism adapted to respond to sudden reduction of brake pipe pressure and to sudden reduction of control connection pressure to vent both said connection and said pipe; independent means for venting the brake pipe and for venting the controlling connection; and dead-man valve means for venting said controlling connection.

5. In an air brake system, the combination of a normally charged brake pipe; a normally charged controlling connection; pressure controlled means for interrupting the supply of air to the system in response to venting of said connection; a vent valve motor including a chamber in communication with the brake pipe, and a movable abutment which moves in response to rapid changes of pressure in said chamber; a one way valve interposed between said connection and said chamber and closing against flow toward the chamber; brake pipe venting means; and means whereby motion of said abutment in response to a sudden reduction of chamber pressure opens said one way valve and said venting means.

6. In an air brake system, the combination of a normally charged brake pipe; a normally charged controlling connection; pressure controlled means for interrupting the supply of air to the system in response to venting of said connection; a vent valve motor including a chamber in communication with the brake pipe, and a movable abutment which moves in response to rapid changes of pressure in said chamber; a one way valve interposed between said connection and said chamber and closing against flow toward the chamber; brake pipe venting means; means whereby motion of said abutment in response to a sudden reduction of chamber pressure opens said one way valve and said venting means; and means for modifying the response of said motor, and comprising a check valve with restricted by-pass for permitting slow flow from the brake pipe to the chamber and more rapid reverse flow.

7. In an air brake system, the combination of a normally charged brake pipe; a normally charged controlling connection normally isolated therefrom; pressure controlled means subject directly to pressure in said connection for interrupting the supply of air to the system and for supplying air to an accessory device in response to venting of said connection; and a brake pipe vent valve mechanism adapted to respond to sudden reduction of brake pipe pressure and to respond to sudden reduction of control connection pressure to vent both said connection and said pipe.

8. In an air brake system, the combination of a normally charged brake pipe; a normally charged controlling connection; pressure controlled means for interrupting the supply of air to the system and for supplying air to an accessory device in response to venting of said connection; a vent valve motor including a chamber in communication with the brake pipe, and a movable abutment which moves in response to rapid changes of pressure in said chamber; a one way valve interposed between said connection and said chamber and closing against flow toward the chamber; brake pipe venting means; and means whereby motion of said abutment in response to a sudden reduction of chamber pressure opens said one way valve and said venting means.

9. In an air brake system, the combination of a normally charged brake pipe; a normally charged controlling connection normally isolated therefrom; pressure controlled means for interrupting the supply of air to the system in response to venting of said connection; a brake pipe vent valve mechanism adapted to respond to sudden reduction of brake pipe pressure and to respond to sudden reduction of control connection pressure to vent both said connection and said pipe; and manually operable means to suspend the interrupting action of said pressure controlled means.

10. In an air brake system, the combination of a normally charged brake pipe; a normally charged controlling connection; pressure controlled means for interrupting the supply of air to the system in response to venting of said connection; a vent valve motor including a chamber in communication with the brake pipe, and a movable abutment which moves in response to rapid changes of pressure in said chamber; a one way valve interposed between said connection and said chamber and closing against flow toward the chamber; brake pipe venting means; means whereby motion of said abutment in response to a sudden reduction of chamber pressure opens said one way valve and said venting means; and manually operable means to suspend the interrupting action of said pressure controlled means.

11. The combination defined in claim 5 in which the motor abutment is a spring loaded flexible diaphragm larger than the one way valve and operates to open the one way valve by thrust against the same.

12. The combination defined in claim 6 in which the motor abutment is a spring loaded flexible diaphragm larger than the one way valve and operates to open the one way valve by thrust against the same.

13. In an air brake system, the combination of a normally charged brake pipe; a normally and independently charged controlling connection; independent means for venting each; and a vent valve adapted to respond to the sudden venting of either to vent both.

14. In an air brake system, the combination of a normally charged brake pipe; a normally and independently charged controlling connection; independent means for venting each; and a vent valve adapted to respond to sudden venting of either to connect the controlling connection with the brake pipe and vent the brake pipe.

15. In an air brake system, the combination of a normally charged brake pipe; a normally and independently charged controlling connection; independent means for venting each; a vent valve adapted to respond to the sudden venting of either to vent both; and valve means directly responsive to pressure changes in the controlling connection and regulating the supply of air to portions of the system.

16. In an air brake system, the combination of a normally charged brake pipe; a normally and independently charged controlling connection; independent means for venting each; a vent valve adapted to respond to sudden venting of either to connect the controlling connection with the brake pipe and vent the brake pipe; and valve means directly responsive to pressure changes in the controlling connection and regulating the supply of air to portions of the system.

CHARLES A. CAMPBELL.